United States Patent [19]
Hartman et al.

[11] Patent Number: 5,702,734
[45] Date of Patent: Dec. 30, 1997

[54] TAKE-OUT AND COOLING APPARATUS

[75] Inventors: Daniel A. Hartman, Cincinnati; Timothy L. Bright, Greenville; Terry A. Shroder, Arcanum, all of Ohio

[73] Assignee: Electra Form, Inc., Vandalia, Ohio

[21] Appl. No.: 359,037

[22] Filed: Dec. 19, 1994

[51] Int. Cl.$^6$ ............... B29C 49/66; B29C 49/70; B29C 49/28

[52] U.S. Cl. ............... 425/534; 425/526; 425/437; 425/444; 264/237

[58] Field of Search .............. 264/237; 425/556, 425/534, 526, 533, 436 R, 437, 444, 404; 414/750, 752, 737, 736

[56] References Cited

U.S. PATENT DOCUMENTS

| | | | |
|---|---|---|---|
| 4,140,464 | 2/1979 | Spurr et al. | 425/533 |
| 4,344,749 | 8/1982 | Fritz et al. | 425/534 X |
| 4,690,633 | 9/1987 | Schad et al. | 425/526 |
| 4,709,803 | 12/1987 | Swiderski | 425/534 X |
| 4,721,452 | 1/1988 | Delfer, III | 425/547 |
| 4,786,455 | 11/1988 | Krishnakumar et al. | 264/237 |
| 4,814,134 | 3/1989 | Brown | 264/297.8 |
| 4,836,767 | 6/1989 | Schad et al. | 425/552 |
| 4,915,611 | 4/1990 | Brown | 425/556 |
| 5,206,039 | 4/1993 | Valyi | 425/534 X |
| 5,234,328 | 8/1993 | Willson et al. | 425/139 |
| 5,338,172 | 8/1994 | Williamson et al. | 425/143 |
| 5,354,194 | 10/1994 | Kresak | 425/436 R |
| 5,443,360 | 8/1995 | Lamb et al. | 414/799 |
| 5,447,426 | 9/1995 | Gessner et al. | 425/534 X |
| 5,509,796 | 4/1996 | Dei Settembrini | 425/534 X |

FOREIGN PATENT DOCUMENTS

| | | | |
|---|---|---|---|
| 4212115 | 6/1993 | Germany | 425/526 |

Primary Examiner—Robert J. Warden
Assistant Examiner—E. Leigh Dawson
Attorney, Agent, or Firm—Locke Reynolds

[57] ABSTRACT

A molded parison handling apparatus for removing hollow plastic parisons used in the manufacture of oriented plastic bottles from an injection molding machine includes a base having an arm coupled to the injection molding machine. A carriage mounted on the arm moves in a first dimension into and out of the space between the molding elements of the molding machine. A frame cooling unit coupled to the carriage engages the body portion of a set of parisons as they are released from the molding machine. A first motor moves the cooling apparatus to any of three preselected positions along the first dimension located outside the molding machine. A transfer assembly includes three sets of grabbers mounted on a gantry for movement with respect to the base. One set of grabbers grabs the finish portion of the parisons from the cooling apparatus. A second and third motor then translates the transfer assembly to one of two remote locations where a stationary cooler receives the body portion of the parisons for additional cooling. The transfer assembly then withdraws a fully cooled set of parisons from one of the stationary coolers, deposits the fully cooled parisons on an exit conveyor, and returns to grab another set of newly released parisons from the frame cooling unit.

24 Claims, 10 Drawing Sheets

TAKE-OUT AND COOLING APPARATUS

BACKGROUND OF THE INVENTION

The present invention relates generally to the art of handling articles following injection molding, and particularly to the art of removing sets of plastic articles from an injection molding machine and cooling the articles prior to subsequent handling and/or processing. The apparatus has particular utility in the removing and cooling of preforms intended for use in the manufacture of plastic bottles.

In the manufacture of plastic articles in injection molding machines, an enhanced production rate is often achieved by simultaneously molding in a single machine a large number of the articles. The rate of production can be measured by the number of articles manufactured by each cycle of the machine divided by the time for each cycle. A number of factors impact on the production rate such as the capacity of the molding machine to plasticize the amount of plastic resin to the appropriate fluid state to permit formation by injection of the number of articles intended during each cycle of the machine.

An important limiting factor is the time required to cool the articles once formed in the molding machine of the plasticized or molten resin. The resin forming the articles must cool from the injection temperature, which is typically several hundred degrees Celsius, down to a temperature at which the articles will remain stable in form as they are handled in subsequent processes, which is generally a temperature less than 100° C. Of course, the exact temperatures are a function of the particular resin employed and well understood by those experienced in the art of injection molding.

The cooling time is a function of the amount of resin employed in the articles and in the thickness of the articles. As the thickness of the articles increases, the thermal conductivity of the plastic, which is generally poor, inhibits the flow of heat from interior portions of the article thus extending this cooling time. It has been recognized that the articles need not be fully cooled while in the injection molding machine so long as the outside surface of the articles is cooled sufficiently to permit withdrawal of the article from the molding machine without distortion and so long as some additional cooling is accomplished by a separate cooling apparatus.

The combination of cooling apparatus with article removal apparatus has been previously employed particularly in connection with the manufacture of preforms used in the formation of molecularly oriented plastic bottles. The cooling apparatus can be employed to cool the preforms down to a storage temperature after which the preforms can be reheated for blow molding at some later time. Alternatively, the preforms may be cooled down to an appropriate temperature for blow molding and transferred directly to a blow molding operation. Due to the difference in the molding temperature as compared to storage temperature that the time required for cooling is different, but that both cooling functions can be accomplished by employing appropriate apparatus outside of the injection molding machine itself.

Examples of such prior art apparatus are to be found in U.S. Pat. Nos. 4,140,464; 4,690,633; 4,721,452; 4,786,455; and, 5,338,172. Certain of these patents and other prior art recognize that the length of time employed in cooling is generally longer than the length of time employed during the injection cycle itself. As a result, such apparatus has generally adopted a greater number of cooling areas than molding areas. Generally, means are provided to shift the articles from the molding area to one of the cooling areas in an organized fashion so the cooling time is maximized and, at the same time, the article production is also maximized.

In some prior art devices, the cooling is not initiated until the article is fully removed from the molding machine, but such a delay in cooling allows some opportunity for unwanted deflection of the articles. Thus, some prior art devices have employed cooling directly on the apparatus which removes the articles from the molding machine. While such cooling during removal of the article from the machine is desirable, the overall speed of operation of the molding machine can be maximized by having the article removing apparatus have as little inertia as possible so that speedy extraction of molded articles can be achieved. It is also desirable for the article removing and cooling apparatus be as simple to construct and operate as possible consistent with the overall objectives of the apparatus.

SUMMARY OF THE INVENTION

In accordance with these desirable attributes, the present invention is intended for use generally with an injection molding machine which is employed to mold sets of articles in molding cavities defined by at least two molding elements which are movable between a closed confirmation, wherein the articles are actually molded, and an open or spaced confirmation, where the articles are released into a space between the molding elements. The take-out and cooling apparatus of the present invention includes a base which is coupled to the injection molding machine to permit accurate coordination of actuation of the apparatus and the molding machine. A molded article engagement apparatus is mounted to an arm for movement with respect to the base and the molding machine in and out of the space between the molding elements. The molded article engagement apparatus engages the molded articles as they are released from the molding elements of the molding machine and initiates cooling of the articles.

A first motor moves the article engagement apparatus from the space between the molding elements to one of a preselected plurality of positions located outside the molding machine. A transfer assembly mounted on a gantry for movement with respect to the base grabs the articles from the article engagement apparatus and transfers them to one of several cooling station where they remain for an additional period of cooling time. The cooling time significantly exceeds the time required for molding of the articles, typically by a multiple of from 2 to 10. After the articles have been fully cooled to the desired temperature, the transfer assembly removes the articles from the cooling station and directs them toward further processing.

One feature of the present invention is the use of a plurality of sets of article grabbers mounted on the transfer assembly, with each set being positioned on the transfer assembly to confront the articles held by the engagement apparatus at each of the preselected plurality of positions. The sets of article grabbers are also positioned to correspond with the position of the several cooling stations. This permits the transfer of a set of freshly molded articles from the molding machine to any of the cooling stations available for use. The invention also has the advantage of the engagement apparatus holding only one set of parisons at a time thus minimizing the inertia of the engagement apparatus.

Another feature of the present invention is the use of one or more storage receivers each of which include at least two cooling stations arranged as sets of individual cooling assemblies for cooling the molded plastic articles. The number of storage receivers and the rate of accession thereto is subject to variation to permit modification of the amount of cooling to which the articles are exposed.

In accordance with a preferred embodiment, both the storage receiver and the engagement apparatus are constructed in similar fashion and include an insert situated within a sleeve, the insert having an interior surface generally matching the molded plastic articles being produced by the molding machine and an outer surface defining a fluid coolant path. The sleeve is preferably made of an low heat transfer material to provide an enhanced economical operation by insulating the coolant for the general environment while focusing the coolant toward the insert and plastic article sought to be cooled.

Another feature of the present invention is the transfer assembly itself which includes a plate having a plurality of pairs of gripper bars situated on one side of the plate having regions for gripping selected portions of the molded plastic articles extending out of the article engagement apparatus. A plurality of cam elements and actuators are coupled to the gripper bars to cause coordinated movement of selected pairs of the gripper bars to achieve contact and release of the molded articles as necessary. In a preferred embodiment, the transfer plate is mounted on a gantry or carriage which is movable linearly with respect to the base over the cooling stations where the molded plastic articles can be stored for a programmed amount of time. The transfer plate is preferably mounted for rotational and vertical movement with respect to the gantry to facilitate handling of the molded articles at the various locations.

Another feature of the present invention is the cooling assembly itself which can be incorporated both at the cooling station and on the article engagement apparatus. The cooling assembly is coupled to a source of fluid coolant and to a source of vacuum, the vacuum being controlled by a spool movably situated within a sleeve so that upon contact by a surface of the molded article the spool moves to a position enhancing the vacuum applied to the article thereby insuring a positive engagement between the article and the cooling assembly. A biasing element biases the spool toward a position so the vacuum access is restricted in the absence of the molded article thereby conserving the amount of energy required to create the vacuum.

Other features and advantages of the present invention will become apparent to those skilled in the art upon consideration of the following description of a preferred embodiment. The description refers to the accompanying drawings which illustrate the best mode of the invention as presently perceived.

DESCRIPTION OF A PREFERRED EMBODIMENT

Figure 1:
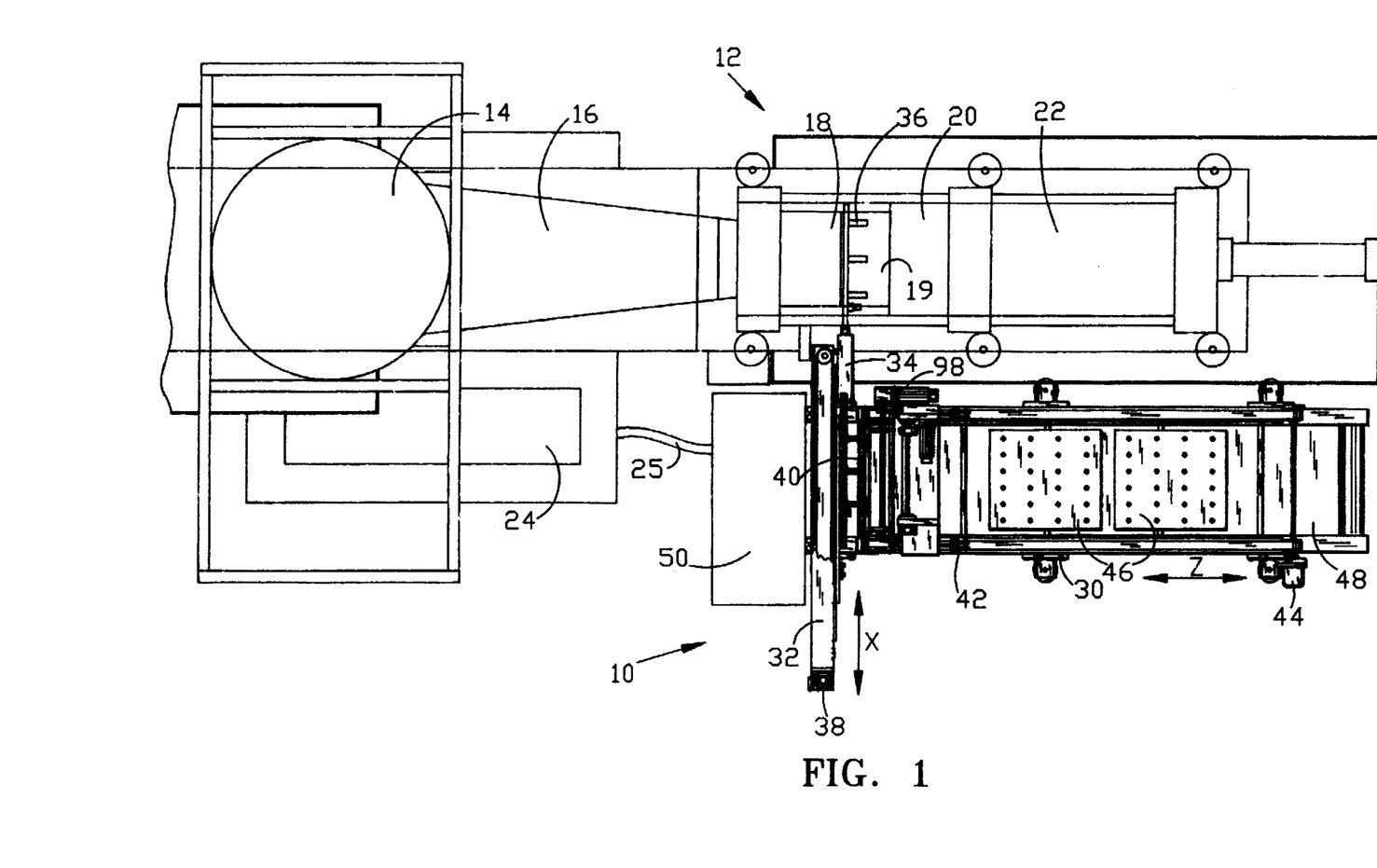
FIG. 1 is a plan view of a take-out and cooling apparatus in accordance with the present invention shown coupled to an adjacent injection molding machine producing articles to be handled by the take-out and cooling apparatus.

A take-out and cooling apparatus 10 in accordance with the present invention is shown in FIG. 1 coupled to an injection molding machine 12. The molding machine 12 includes a source of resin 14 which feeds one or more plasticizer injection units 16 which plasticizes the resin until the resin acquires the appropriate temperature and fluid conditions to permit injection. A first mold element 18 is coupled to the plasticizer injection unit 16. A second mold element 20 is coupled to a ram or other mold closing and opening unit 22 which moves mold element 20 from the illustrated open position where mold element 20 is spaced from mold element 18 to a closed position (not illustrated) where mold elements 18 and 20 are contiguous. In the closed position, a plurality of spaces or cavities are defined between mold elements 18 and 20 which receive the molten resin from the plasticizer injection unit 16 to form molded articles. The general operation of the injection molding machine 12 is controlled by a control unit 24 in the conventional manner.

The take-out and cooling apparatus 10 includes a base 30 and arm 32 is fixed to the base 30 and is coupled to the molding machine 12 so that the molding machine 12 and take-out and cooling apparatus 10 are at a pre-set location with respect to each other. A carriage 34 is mounted for movement on arm 32 in the dimension X. The carriage 34 carries a frame unit including molded article engagement apparatus 36 which moves into and out of the space 19 between the molding elements 18 and 20 when the mold elements are in the illustrated open confirmation. The article engagement apparatus 36 engages the articles molded by the molding machine 12 as they are released from the molding elements 18 and 20. A motor 38 coupled to arm 32 and to carriage 34 moves the carriage and end of arm article engagement apparatus into and out of space 19.

As the carriage 34 and article engagement apparatus exit space 19, the motor 38 moves the article engagement apparatus 36 to one of a pre-selected plurality of positions located in confronting relationship to a transfer assembly 40 coupled to a gantry 42 which is movable with respect to base 30 by means of motor 44. The molded articles are grabbed from the article engagement apparatus 36 by the transfer assembly 40 and moved in the dimension Z to one of several cooling stations 46 where the articles remain for a programmed cooling time.

As a general rule, the cooling time significantly exceeds the time required for molding the articles in the injection molding machine 12 and, as a result, the number of positions for receiving articles for cooling far exceeds the number of articles actually molded in each cycle of the molding machine. After the articles have been fully cooled to the desired temperature, the transfer assembly 40 removes a set of the articles from the cooling station 46 and deposits them on moving belt 48 where they are transported for processing. The coordination of the operation of the take-out and cooling apparatus 10 and the injection molding apparatus 12 is achieved by a control unit 50 for the take-out and cooling apparatus 10. The control unit 50 is coupled to control unit 24 of the molding machine 12 by appropriate cabling 25. Additional details of the take-out and cooling apparatus 10 will be revealed from a review of FIGS. 2–13.

Figure 2:
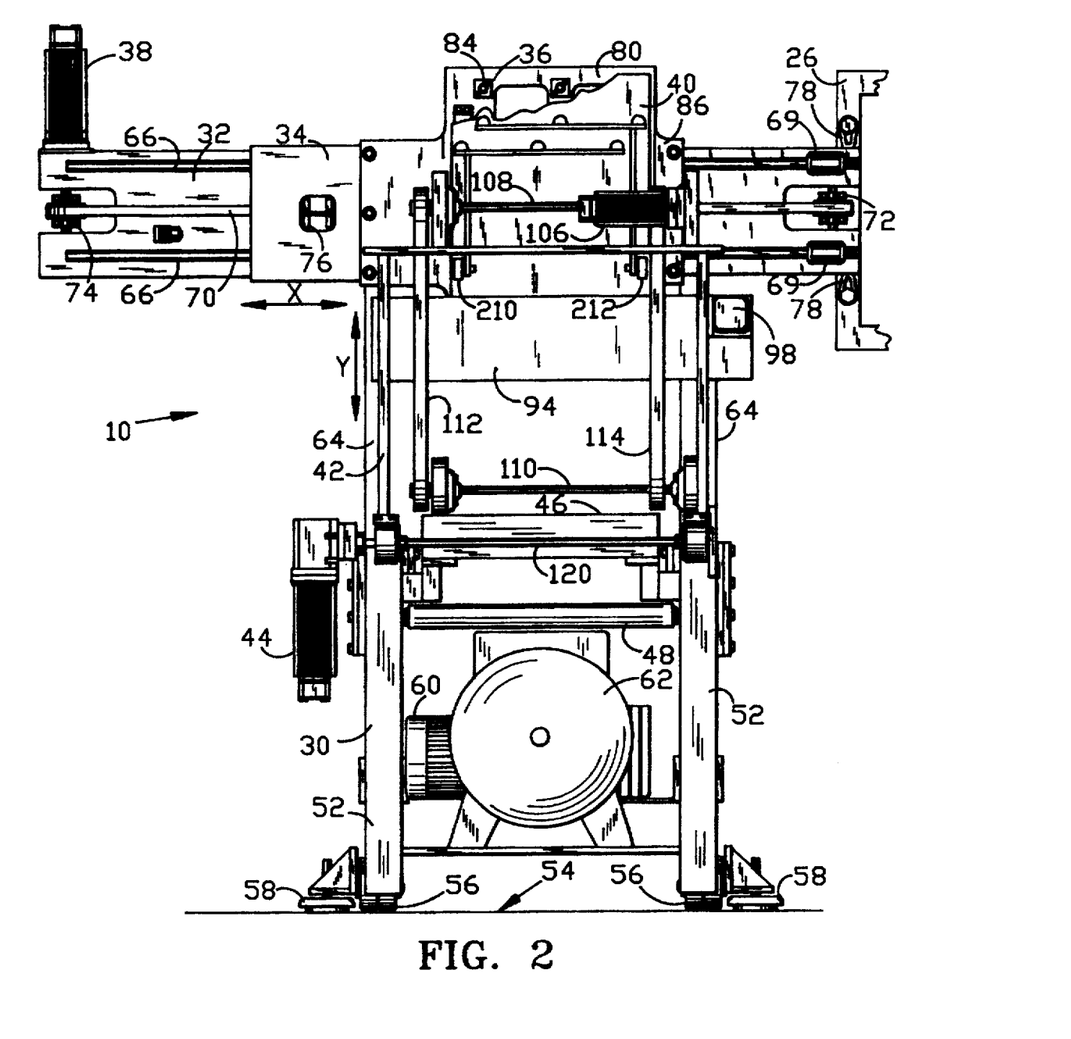
FIG. 2 is an end elevation view of the apparatus of the present invention shown in FIG. 1 as seen from the right side of FIG. 1.

The base 30 includes a generally rectangular open framework defined by vertical legs 52 supported with respect to the floor 54 on rollers 56 which permit the apparatus 10 to be moved with respect to the molding machine 20 for servicing or in other similar situations. A plurality of feet 58 are also provided at the bottom of the legs 52 which can be adjusted downwardly to fix the position of the base 30 with respect to the molding machine 12. The base 30 supports a pump 60 and tank 62 which together form a supply of vacuum. The base 30 includes a pair of supporting columns 64 which support arm 32.

Figure 3:
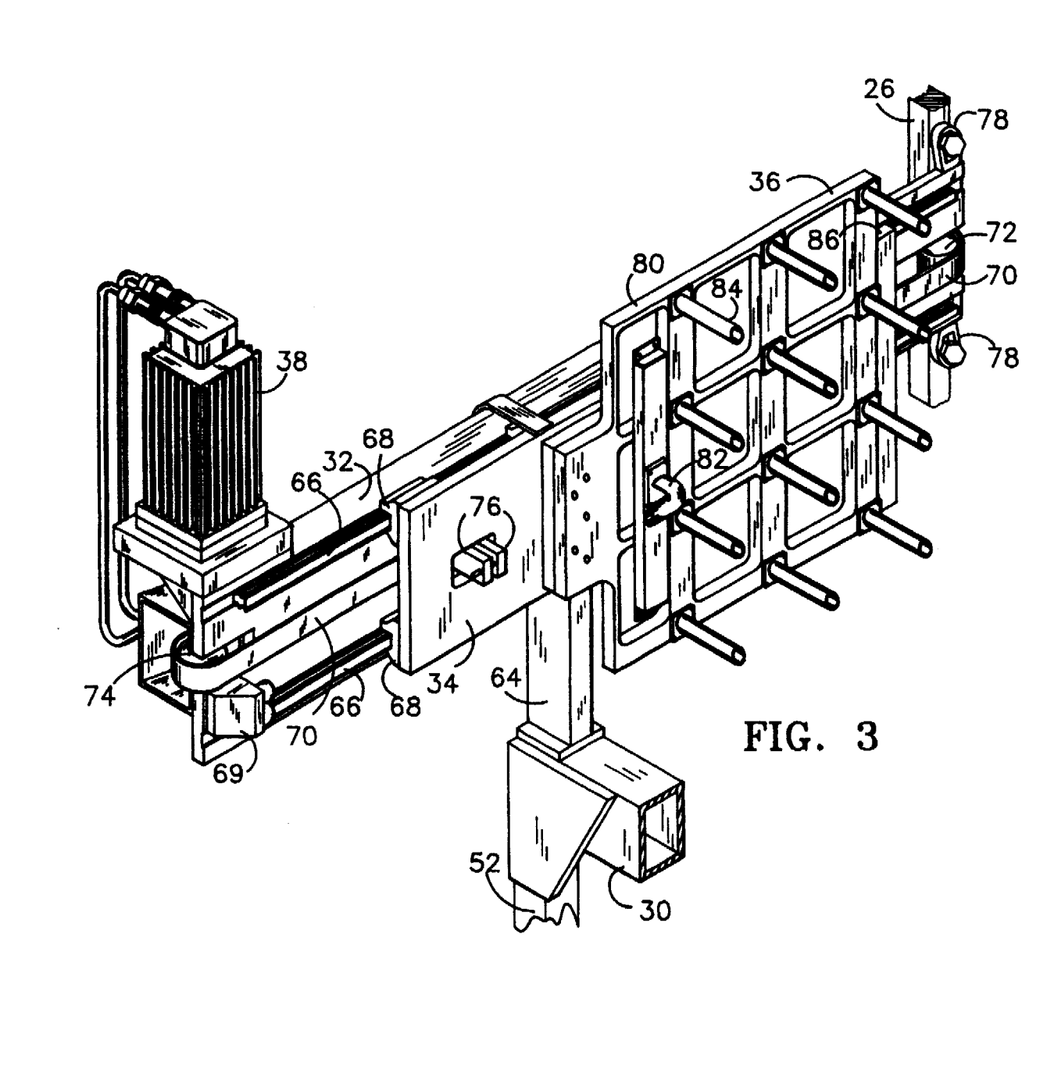
FIG. 3 is a perspective view of the molded article engagement apparatus and carriage mounted for reciprocal motion into and out of the molded machine.

Arm 32 comprises a generally horizontally elongated member and includes a pair of tracks 66. The arm 32 is preferably coupled to an element 26 of the injection molding machine by means of coupling elements 78. Bumpers 69 can be provided at the ends of the arm 32 to prevent over travel of the carriage 34 along tracks 66. The carriage 34 is mounted for horizontal displacement along the tracks 66 in the dimension X by linear bearings 68. The position of the carriage 34 with respect to arm 32 is defined by a drive belt 70 which loops around idler pulley 72 and driven pulley 74 coupled to motor 38. The ends of belt 70 are fixed to carriage 34 by tension elements 76.

The article engagement apparatus 36 is coupled to carriage 34 to permit extension of article engagement apparatus 36 into space 19 shown in FIG. 1. The illustrated article engagement apparatus is intended for use to take-out and cool preforms used in the manufacture of plastic bottles. As such the article engagement apparatus includes a frame 80 which is coupled to the source of vacuum 62 and to a supply of cooling liquid such as chilled water through flexible cable 82. A plurality of individual article receivers 84 are fixed to the frame 80 at a spacing D equal to the spacing of the articles as they are manufactured in the molding machine 12. The number of article receivers 84 illustrated in the figures is only 12, this number being chosen for simplicity of illustration. In a preferred embodiment, forty-eight such individual article receivers 84 are provided on a single frame 80. Other suitable numbers and arrangements of such individual article receivers could be provided as required by the particular mold employed in the molding machine. A bumper 86 is provided on the end of the frame 80 opposite the carriage 34 to prevent damage to the molding machine in the unlikely event of over travel of the carriage 34 on tracks 66.

Figure 4:
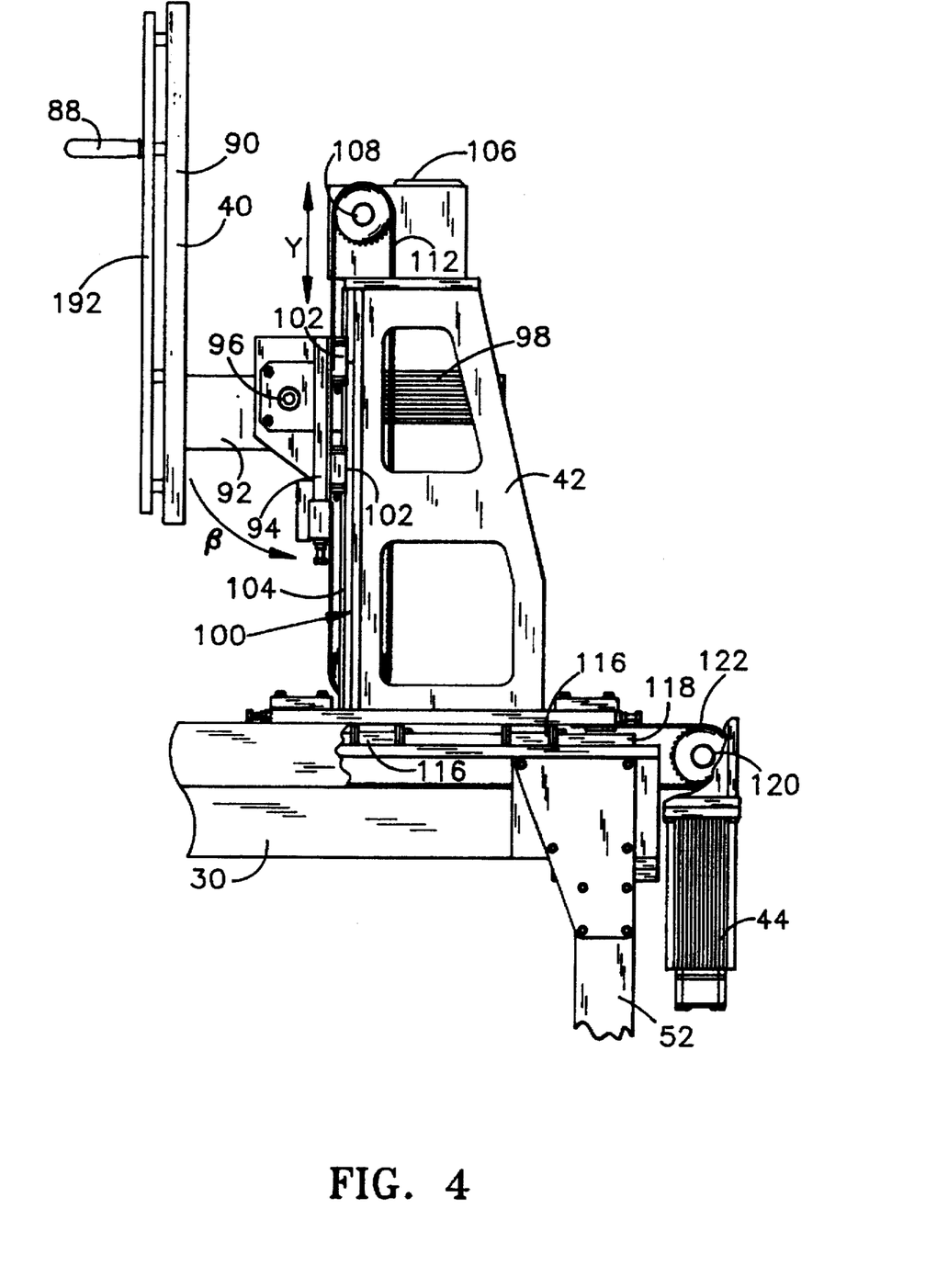
FIG. 4 is a side elevation view of a transfer assembly including a gantry adapted for linear motion along the base, the transfer assembly including a gripper plate rotatable and vertically translatable relative to the gantry.

The transfer assembly 40 includes a plate 90 supported by stand-offs 92 journaled to carrier 94 through pivot bearing 96. The plate 90 can be pivoted from the illustrated substantially vertical orientation through angle β to a substantially horizontal orientation about pivot bearings 96 by motor 98 which is fixed to and travels with carrier 94. The carrier 94 is mounted for vertical movement in the dimension Y on the forward face 100 of gantry 42 by linear bearings 102 engaging vertical track 104. The vertical movement of carrier 94 is achieved by means of motor 106 acting through driven shaft 108 and idle shaft 110 to drive belts 112 and 114.

The gantry 42 is movable along the base 30 on bearings 116 which engage track 118. Motor 44 acting through driven shaft 120 and an idler shaft (not shown) drives belts 122 to move the gantry 42 along the length of the base 30 in the dimension Z. The motors 38, 44, 98 and 106 each operate independent of each other to define a four axis system of movement of the molded articles from the molding machine 12 to the cooling stations 46 in accordance with an operational scheme controlled by control 50 in coordination with injection machine control 24.

Figure 5:
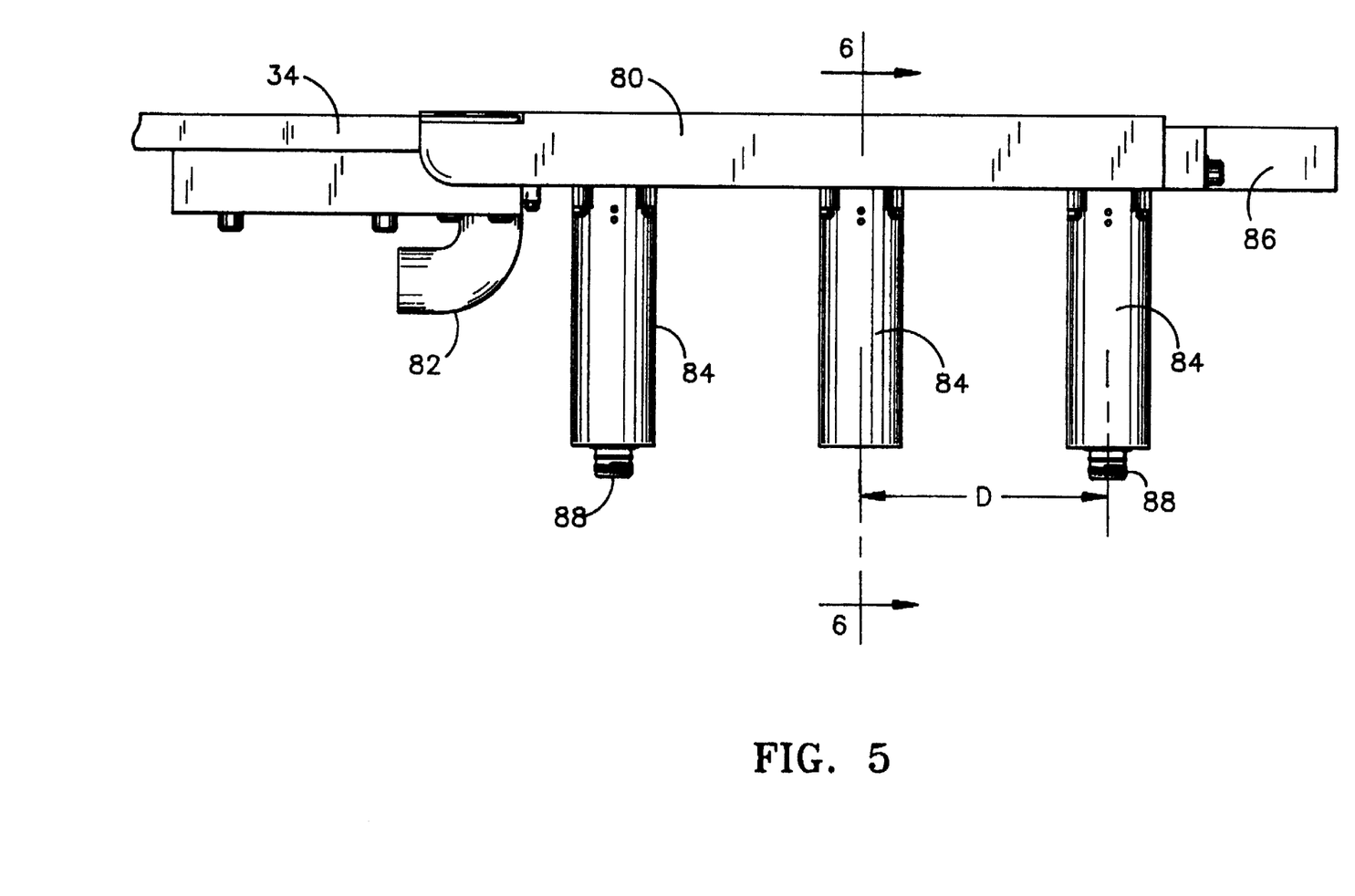
FIG. 5 is a plan view of the molded article engagement apparatus shown in FIG. 3 with two articles engaged therein.
Figures 6, 7:
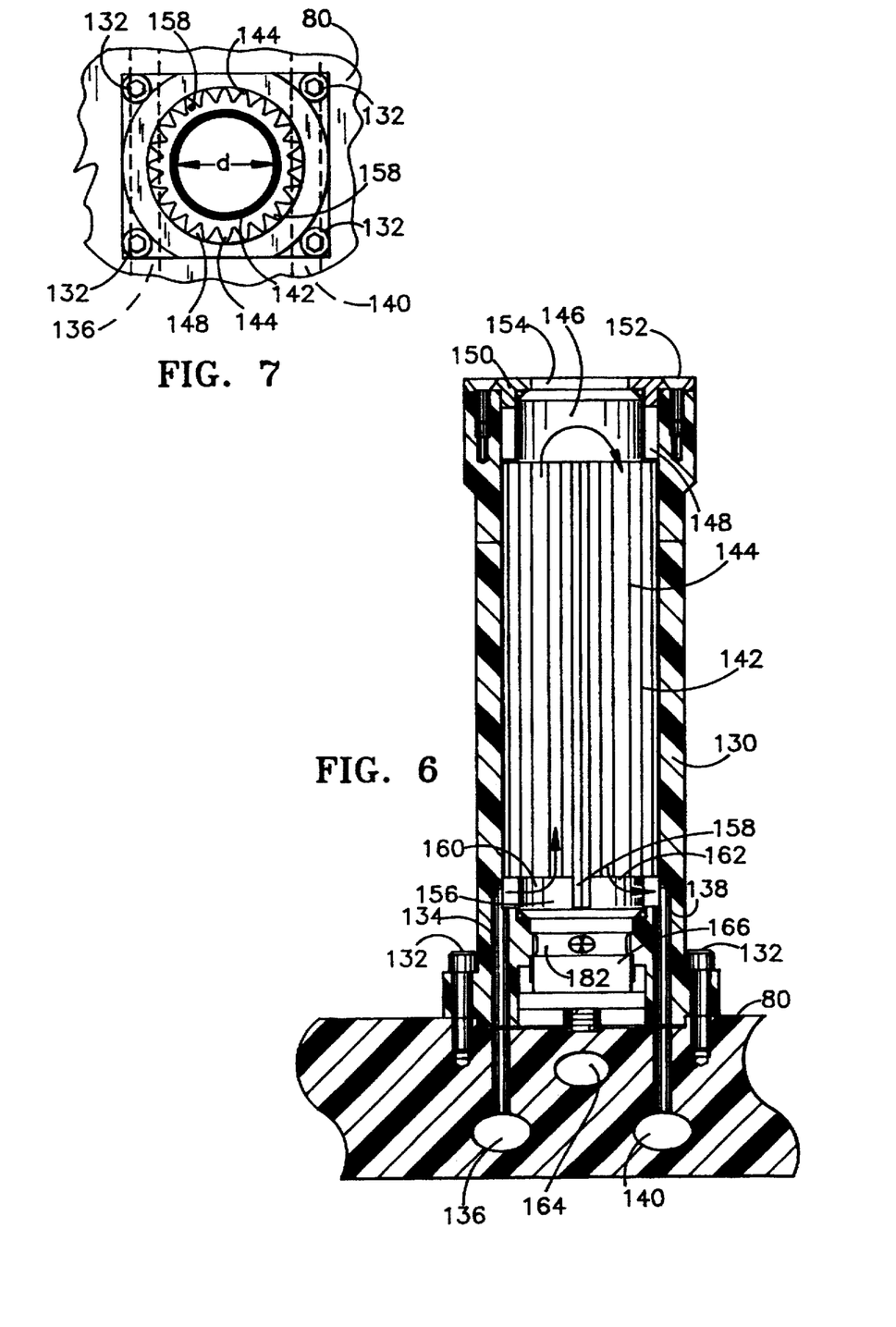
FIG. 6 is a partial sectional view taken along lines 6—6 of FIG. 5 showing a cooling assembly with the cooling insert shown in elevation.
FIG. 7 is an elevation view of a cooling assembly with the collar removed.

The article receiver tubes 84 on the article engagement apparatus 36 and the article receiving tubes in the cooling stations 46 are preferably of identical construction to minimize the spare part inventory. On the article engagement apparatus 36, each article holder 84 is separated from the next adjacent article holder by a center-to-center distance D defined by the spacing between the cavities defined by the pair of molds 18 and 20. In order that the carriage 34 and article engaging apparatus 36 have a low inertia, the frame 80 is desirably made of a lightweight material such as 6061-T6 aluminum. A superior performance of the frame 80 can be achieved by selecting an acetal copolymer engineering plastic such as ACETRON GP™ manufactured by Polymer Corporation, Reading, Pa., or an equivalent engineering grade plastic having a thermal conductivity of less than about $6 \times 10^{-4}$ cal. cm./sec. cm.$^2$ °C. In the cooling stations 46, the separation between the individual article holders in the X dimension is equal to the spacing of the article grabbers on transfer assembly 40.

Each of the individual article receivers 84 of both the article engaging apparatus 36 and the cooling stations 46 is shown in greater detail in FIGS. 6–9 to comprise a sleeve 130 fixed by bolts 132 to the frame 80 or other equivalent support. The sleeve 130 which is preferably made of ACETRON GP™ includes a water inlet channel 134 coupled to a water supply channel 136 within frame 80. The sleeve 130 also includes a water drain channel 138 coupled to channel 140 within frame 80. The channels 136 and 140 are coupled through coupling 82 to a remote supply of chilled water which is introduced into channel 136 and withdrawn from channel 140. Within sleeve 130 is an insert 142 preferably made of 6061-T6 aluminum or other material having a high thermal conductivity. The insert 142 includes in a middle portion a plurality of radiating fins 144. An upper end 146 of the insert is of reduced diameter to define an annular space 148 between the insert 142 and the sleeve 130. The annular space 148 is closed on the upper end by collar 150 secured by screws 152. The collar 150 has a central opening 154 dimensioned to match or slightly exceed the dimension of the molded article sought to be handled by the take-out and cooling apparatus 10.

The lower end 156 of insert 142 is also of reduced diameter except in two locations diametrically opposite each other where a single fin 144 has an extended portion 158 which acts to separate a water entry space 160 from a water exit space 162 situated between the insert lower end 156 and the sleeve 130. The two extended portions 158 cause water entering through channel 134 to follow the path indicated by the arrows in FIG. 6 upward on the left side of the insert 142 and then to proceed downward on the right side of insert 142 and out through channel 140. The insert 142 preferably has an inner diameter d which is a few hundredths of a millimeter greater in diameter than the maximum diameter of the article sought to be extracted and cooled by the apparatus.

In addition to water channels 136 and 140, the frame 80 also includes a vacuum channel 164 which is coupled to the source of vacuum and to the interior of insert 142 by way of a sliding spool 166. The spool 166 is captured within sleeve 130 and has an upper end shown in FIGS. 8 and 9 which extends into insert 142. The sleeve 130 includes a pair of vertical vacuum channels 168 and horizontal stub channels 170 which couple the vacuum to a small annular space separating the lower spool of spool 166 from the interior surface of sleeve 130. The small annular space couples the vacuum to the space 172 existing between the bottom of the spool 166 and plate 80. A spring 174 biases the spool 166 upward to the position shown in FIG. 8. The spool 166 also includes vertical channels 176 running from the bottom 178 of the spool 166 to a concave dished surface 180 at the top of the spool 166. Spool 166 also includes a circular channel 182 and a pair of intersecting horizontal channels 184 terminating in circular channel 182.

Figure 8:
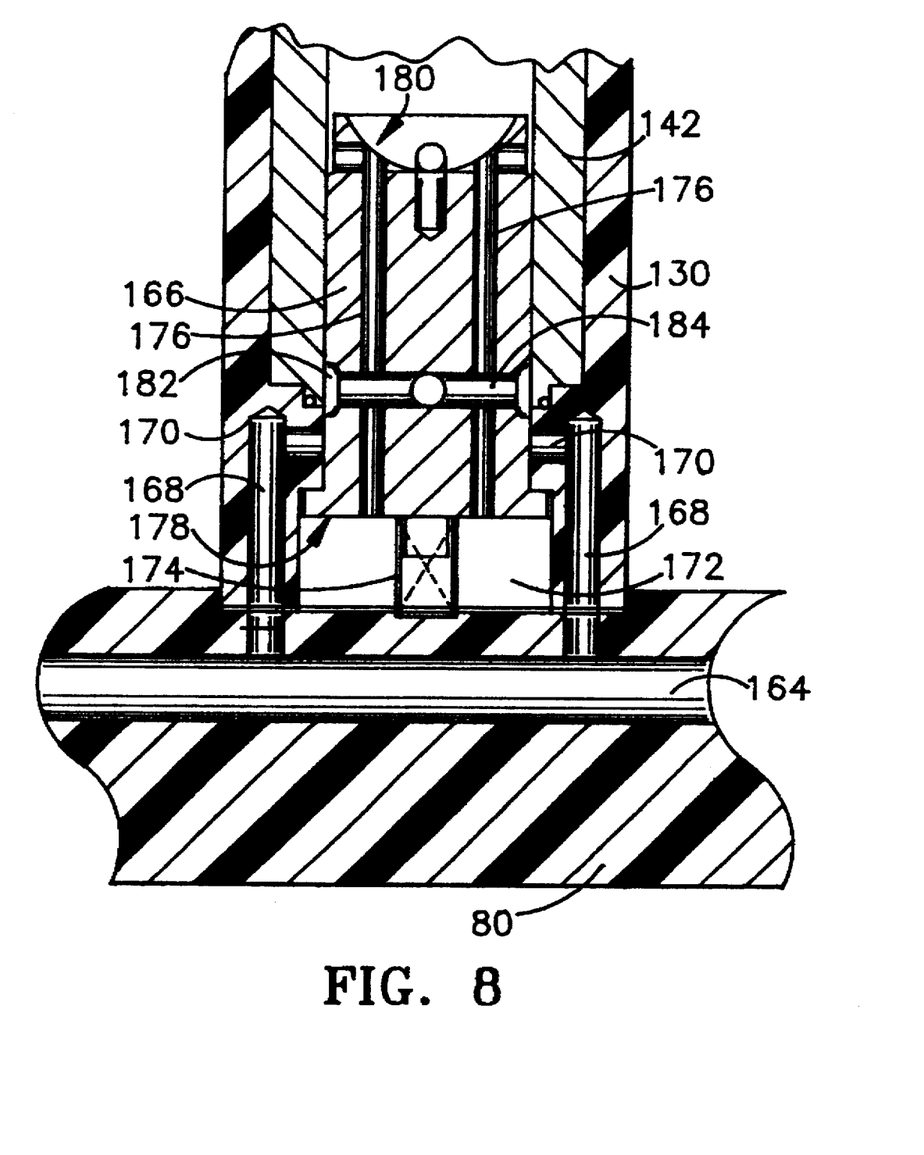
FIG. 8 is a sectional detail taken at right angles to FIG. 6 showing the spool valve in an upper most position.
Figure 9:
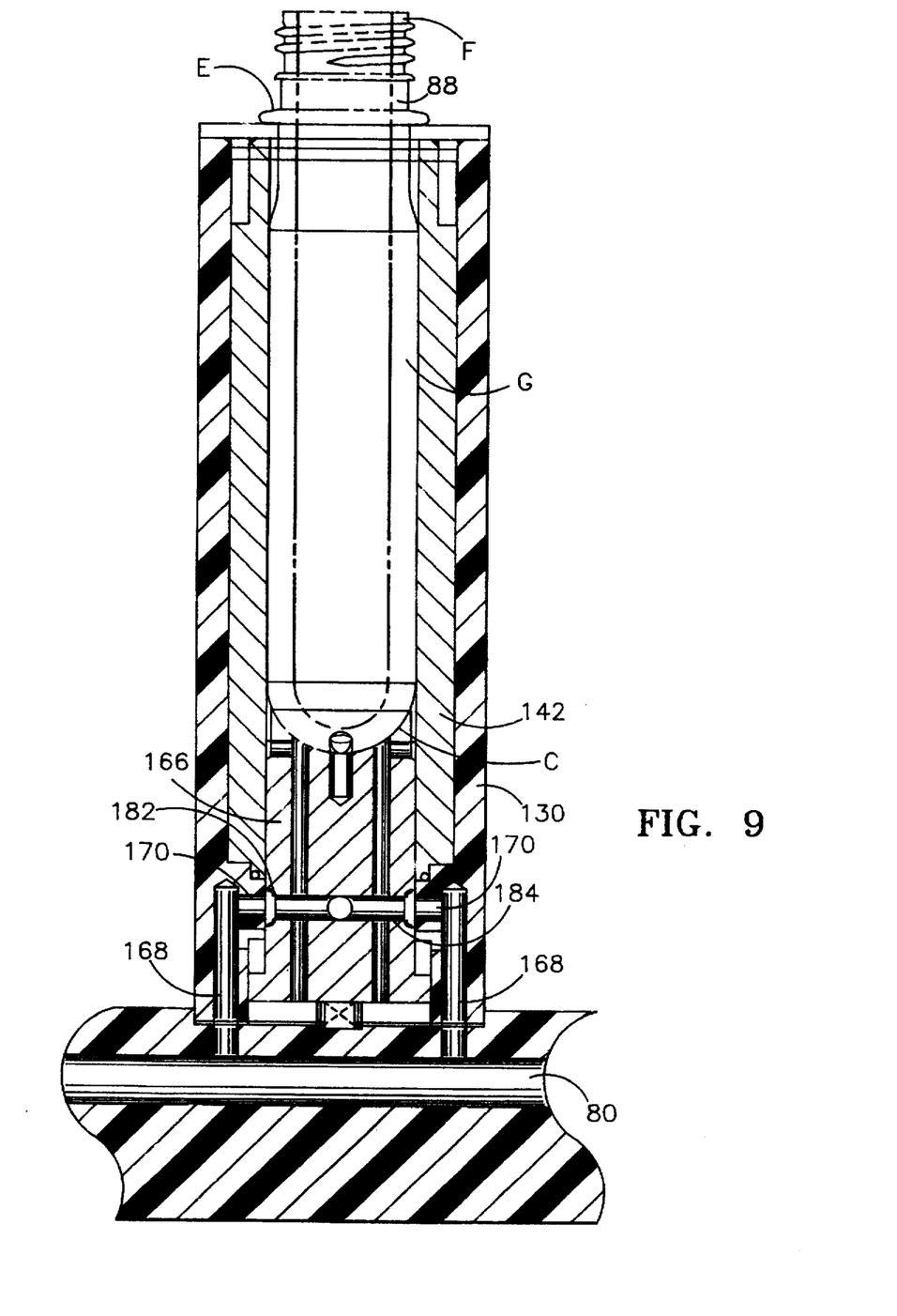
FIG. 9 is a sectional view similar to FIG. 8 with the spool valve shown in a lowered position as a result of the presence of a molded article shown in phantom.

The small dimension existing between the outer surface of spool 166 and the inner surface of sleeve 130 below channel 182 allows only a small flow of air down the interior of the insert 142 through vertical channels 176 into space 172. This throttling action of this close space insures that when the spool is situated as shown in FIG. 8 there is very little flow of air into the vacuum line 164. This small flow of air is sufficient to aid in the capture of articles from the molding machine 12 when the molded article engagement apparatus 36 is in space 19.

The molded articles 88 handled by the preferred embodiment of this invention are generally of a test tube shape having a rounded bottom C and having a support flange E separating a lower body portion G from a finish portion F intended to engage a closure. The curvature of the dish-shaped upper surface of spool 166 conforms generally to the outer surface confirmation of the bottom end C of article 88. Thus, upon insertion of article 88, the upper ends of channels 176 are obstructed thus substantially prevent the flow of any air down channels 176 into space 172. The absence of this flow of air causes the vacuum within space 172 to increase which, in turn, causes a downward pressure on the spool 166 by the air pressure acting on the interior of article 88. This differential in air pressure overcomes the biasing force of spring 174 thus causing a downward movement of spool 166 from the position shown in FIG. 8 to the position shown in FIG. 9. This downward movement of the spool 166 couples the horizontal channels 170 in sleeve 130 with the circular channel 182 and horizontal intersecting channels 184 which effectively latches the spool 166 in the downward position and maintains a hard vacuum hold on molded article 88 until the article is forcibly removed.

Figure 10:
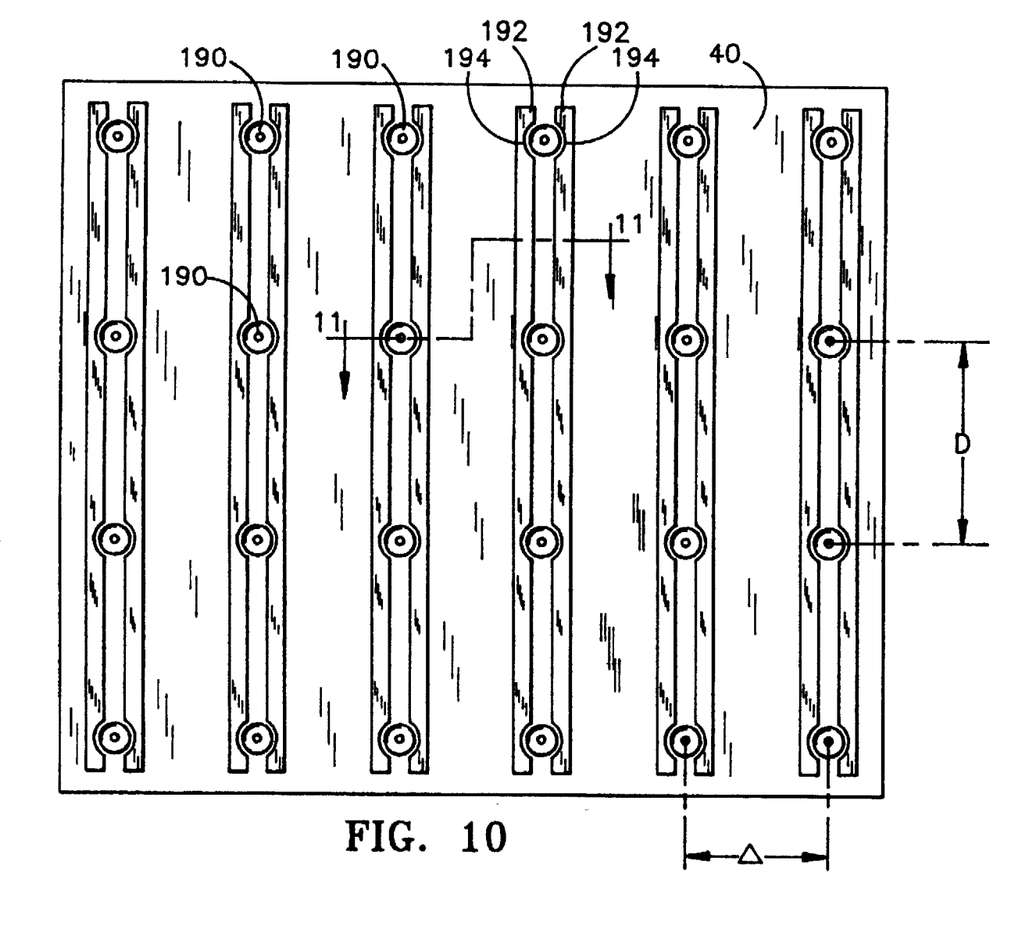
FIG. 10 is an elevation view of the molded article grabber plate of the transfer assembly.

The removal of article 88 from the individual article holders in both the article engagement frame 36 and in the article cooling frame 46 is achieved by means of the article grabbers forming a portion of the article transfer assembly 40. The details of construction are shown in FIGS. 10–13. The article grabber is formed on the front surface of plate 40 by an arrangement of knobs 190 which are arranged in an array having a vertical spacing D, corresponding to the spacing of the articles when molded in the molds 18 and 20, and a horizontal spacing Δ, which is equal to a fraction of the spacing D. While the spacing Δ is shown in FIG. 10 to equal D/2, in the preferred embodiment, the value Δ equals D/3. Those skilled in the art will appreciate that the value Δ could assume any value D/n where "n" is an integer so long as other engineering considerations would not prevent this closer spacing.

Figure 11:
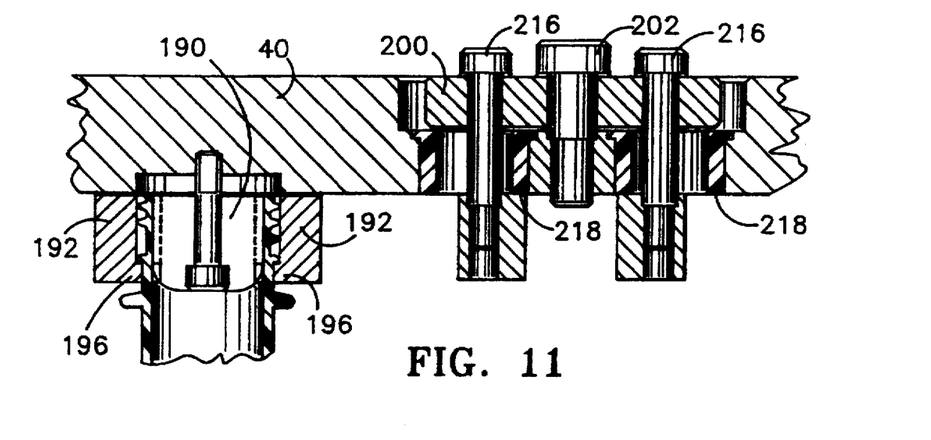
FIG. 11 is a sectional view taken along line 11—11 from FIG. 10.
Figure 12:
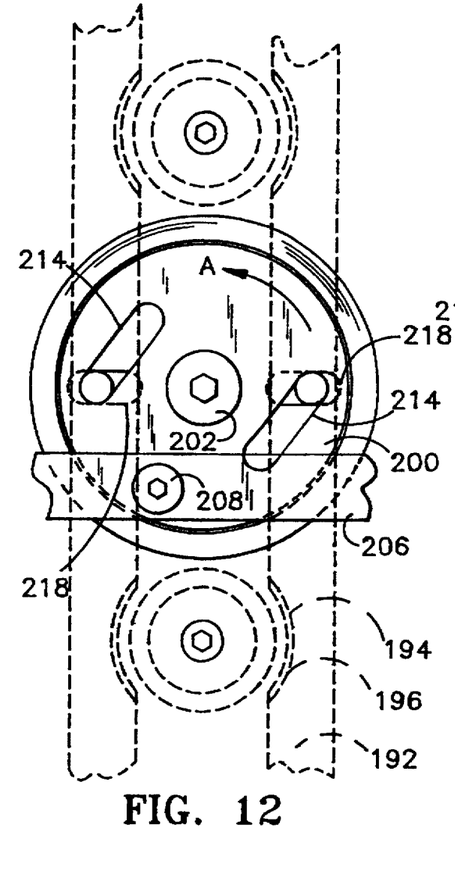
FIGS. 12 and 13 are elevation detail views of the molded article grabber actuator showing the actuation of the molded article grabber bars in phantom.
Figure 13:
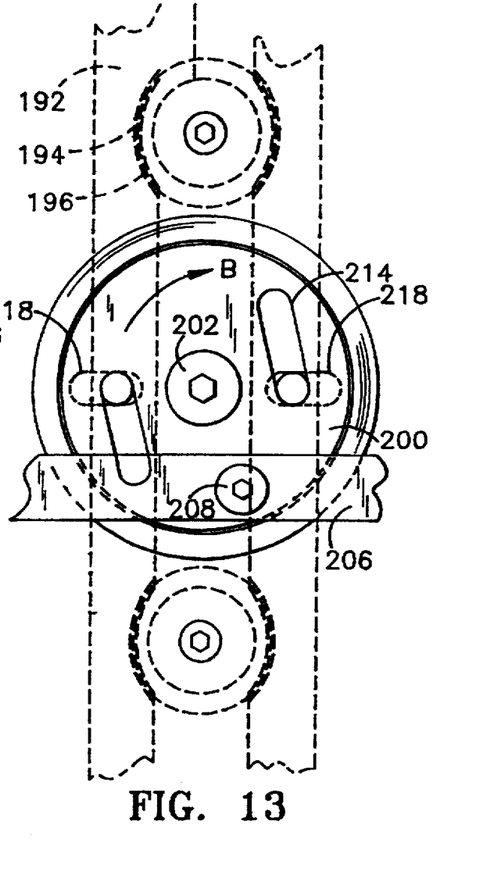

On either side of the knobs 190 are a pair of gripper bars 192 which include arcuate indentations 194 confronting each of the knobs 190. In the preferred embodiment as shown in FIGS. 11–13, each of the arcuate indentations 194 includes a shoulder 196 adapted to engage the molded preform 88 between the finish F and support flange E. Each pair of gripper bars 192 reciprocate together between the unclamped position shown in FIG. 12 and the clamped position shown in FIG. 13 by virtue of actuators 200 secured to plate 40 by pivot stems 202 which permit the actuators to rotate between the two positions illustrated in FIGS. 12 and 13. The rotation is caused by a force acting on actuator bar 206 which is coupled to actuator 200 by bolt 208. The actuator bars 206 are in turn coupled to solenoids 210 and 212 shown in FIG. 2.

The actuators 200 include diagonal slots 214. Pins 216 pass through slots 214 and through elongated bushings 218 in plate 40 and are coupled to bars 192. The solenoids 210 and 212 are coupled to two different sets of actuators 200 so actuation of one of the solenoids 210 or 212 causes only a selected set of the pairs of bars 192 to clamp or unclamp by virtue of the action of bar 206 causing rotation of actuators 200. The set of actuators actuated by a single actuator bar 206 is separated by a distance D so that an entire set of articles spaced at the manufacturing distance D can be grabbed from the article engaging apparatus 36 by actuation of a single actuator 210 or 212 depending upon the alignment of the individual article holders 84 with respect to the various sets of knobs 190.

To grab the molded articles, the actuator bar 206 is forced in the direction to cause rotation of the actuator 200 in the direction A shown in FIG. 12 to move to the position shown in FIG. 13. To release the articles, the actuator rod is driven in the opposite direction to cause rotation of actuator 200 in the direction B shown in FIG. 13 to drive the actuator toward the position shown in FIG. 12.

In operation, the control 50 will receive a signal from controller 24 indicating that mold element 20 has moved to a position to define space 19 between mold element 20 and mold element 18 and is ready to release the articles molded by the machine 12. The controller 50 will then actuate motor 38 to cause carriage 34 to move in the direction X toward the molding machine 12 thus inserting the article engagement apparatus 36 to the point where the individual article receiving tubes 84 are aligned with the articles held by mold unit 20. Upon attaining that alignment, the controller 50 will instruct controller 24 to cause the molded parts to be ejected from mold 20 in such a fashion as to be inserted into the individual receiver tubes 84. Once the ejector of the molding machine 12 has completed ejection of molded articles from mold unit 20, a signal is sent from controller 24 to controller 50 which in turn actuates motor 38 to move the carriage 34 and article engaging apparatus 36 in the direction X out of space 19 and into alignment with one of the sets of the article grabbers on transfer mechanism 40.

Upon achieving the desired position, controller 50 actuates motor 44 to move gantry 42 and gripper assembly 44 toward the article engaging apparatus causing the knobs 190 to be inserted into the open mouths of the molded preforms 88. An appropriate one of actuators 210 or 212 is then actuated to clamp the gripper bars to the finish of the molded preforms 88 and motor 44 is actuated to withdraw the preforms 88 from the individual tubes 84 on the article engagement apparatus 36. Once the molded preforms have been withdrawn from the tubes 84, the controller 50 sends a ready signal to controller 24 indicating the readiness of the molded article engagement apparatus 36 to again retrieve a fresh set of molded preforms from the molding machine.

As the motor 44 is moving the gantry 42 in the direction Z along the base 30 of the take-out and cooling apparatus 12, motor 98 is actuated to rotate plate 40 in the direction β about axis 96 until the plate 40 moves from the vertical attitude shown in FIG. 4 to a horizontal attitude. The motor 44 is stopped so the preforms 88 held by the article transfer plate 40 are aligned with an open set of cooling tubes in one of the cooling stations 46. Motor 106 is then actuated to cause downward movement in the direction Y to insert the preforms 88 into the individual cooling tubes of the selected cooling station 46. At the lowermost position, the actuator 210 or 212 is actuated to release the set of preforms into the cooling tubes. At the same time, the other actuator 210 or 212 is actuated to grab an existing cold set of preforms.

Motor 106 is then actuated in the opposite direction to move the carrier 94 vertically in dimension Y a distance sufficient to withdraw the cold preforms from the cooling station. Motor 44 is then actuated to displace the gantry 42 in the direction Z to a position where the cold preforms can be released onto belt 48. Following release by actuation of one of the actuators 210 or 212, motor 98 is then actuated to rotate the plate 40 from the horizontal attitude to the vertical attitude shown in FIG. 4 through angle β to where the grabbers are ready to grab the next set of hot preforms from the article engagement apparatus 36 which has already entered and withdrawn from the molding machine 12. The coordination of the various motor actuations is achieved by control 50 with appropriate sensors and transducers as would be apparent to those skilled in the art.

Although the invention has been described in detail with reference to the illustrated preferred embodiment, variations and modifications exist within the scope and spirit of the invention as described and as defined in the following claims.

What is claimed is:

1. An article handling apparatus for removing articles from a molding machine, the molding machine including at least two molding elements movable between a closed conformation wherein the articles are molded and an open conformation where the articles are released in a space between the molding elements, the article handling apparatus comprising:

a base including an arm coupled to a molding machine, an carriage mounted on the arm for movement in a first dimension into and out of the space between the molding elements when in said spaced conformation, a molded article engagement apparatus coupled to the carriage for engaging the molded articles as they are released from the molding machine, a first motor coupled to the arm for moving the carriage and engagement apparatus between said space between the molding elements and any of a preselected plurality of positions located outside the molding machine, and a plurality of sets of article grabbers, each set of the article grabbers mounted with respect to the base for movement to any of a corresponding separate preselected plurality of remote positions, for grabbing the articles from the article engagement apparatus, a set of the article grabbers being positioned to confront the articles held by the engagement apparatus at each of said preselected plurality of positions and to grab and move the confronted articles to any of the corresponding separate preselected plurality of remote positions, so that operation of the first motor moving the carriage and the engagement apparatus to one of the preselected plurality of positions located outside the molding machine achieves a selection of at least one of the corresponding separate preselected plurality of remote positions for deposit of the articles.

2. The article handling apparatus of claim 1 further comprising:

a gantry mounted on the base for movement in a second dimension generally orthogonal to said first dimension, said article grabbers being mounted on the gantry for movement therewith, and a second motor coupled to the gantry for moving the gantry and article grabbers between a position contiguous to the engagement apparatus where the articles are grabbed and at least one of said remote positions.

3. The article handling apparatus of claim 2 further comprising at least one storage receiver situated at one of said remote positions for receiving the molded articles from the article grabbers.

4. The article handling apparatus of claim 3 wherein the storage receiver includes cooling apparatus for cooling the molded articles.

5. The article handling apparatus of claim 2 further comprising at least one conveyor situated at one of said remote positions for receiving the molded articles from the article grabbers.

6. The article handling apparatus of claim 2 further comprising:

a mounting for said plurality of sets of article grabbers including a pivot axis, and a third motor for rotating the mounting about the pivot axis from a plane generally aligned with the engagement apparatus to a plane generally orthogonal thereto.

7. The article handling apparatus of claim 1 further comprising a plurality of actuators, each actuator coupled to one of the sets of article grabbers for separately actuating each article grabber set.

8. The article handling apparatus of claim 1 wherein the molded article engagement apparatus includes cooling apparatus for cooling the molded articles as they are moved from the space between the molding elements to any of the preselected plurality of positions located outside the molding machine.

9. A molded article handling apparatus for removing hollow plastic articles from an injection molding machine, the injection molding machine including at least two molding elements movable between a closed conformation wherein the hollow plastic articles are molded and an open conformation wherein the hollow plastic articles are released in a space between the molding elements, the molded article handling apparatus comprising:

a base including an arm coupled to an injection molding machine, an carriage mounted on the arm for movement in a first dimension into and out of the space between the molding elements when in said spaced conformation, a molded article engagement apparatus coupled to the carriage for engaging the molded hollow plastic articles as they are released from the molding machine, the engagement apparatus including a cooling assembly for cooling the molded hollow plastic articles while they are engaged by the engagement apparatus, a first motor coupled to the arm for moving the carriage and engagement apparatus between said space between the molding elements and any of a preselected plurality of positions along the first dimension located outside the molding machine, and a transfer assembly including a plurality of sets of article grabbers, each set of the article grabbers mounted for movement with respect to the base to any of a corresponding separate preselected plurality of remote positions, for grabbing the hollow plastic articles from the molded article engagement apparatus, a set of the article grabbers being positioned to confront the articles held by the engagement apparatus at each of said preselected plurality of positions along the first dimension and to grab and move the confronted articles to any of the corresponding separate preselected plurality of remote positions, so that operation of the first motor moving the carriage and the engagement apparatus to one of the preselected plurality of positions located outside the molding machine achieves a selection of at least one of the corresponding separate preselected plurality of remote positions for deposit of the molded articles.

10. The molded article handling apparatus of claim 9 further comprising:

a gantry mounted on the base for movement in a second dimension generally orthogonal to said first dimension, said transfer assembly being mounted on the gantry for movement therewith, and a second motor coupled to the gantry for moving the gantry and transfer assembly between a position contiguous to the engagement apparatus where the hollow plastic articles are grabbed and at least one of said remote positions along said second dimension.

11. The molded article handling apparatus of claim 10 further comprising at least one storage receiver situated on the base at one of said remote positions along the second axis for receiving the molded hollow plastic articles from the article grabbers, each storage receiver including a cooling assembly for cooling the molded hollow plastic articles while they are being stored by the storage receiver.

12. The molded article handling apparatus of claim 11 wherein the storage receiver cooling assembly comprises:

a support connected to the base including connections to a source of fluid coolant and to a source of vacuum, at least one sleeve fixed to the support, and an insert, situated within each sleeve, the insert having an outer surface defining within the sleeve a fluid coolant path coupled to the source of fluid coolant, the insert having an interior surface matching, but slightly larger than, the molded hollow plastic article outer surface, and an open end permitting insertion of the molded article within the insert.

13. The molded article handling apparatus of claim 12 wherein the storage receiver cooling assembly further comprises:

a spool situated within each sleeve having an outer surface defining within the sleeve a restricted path coupled to the source of vacuum, the spool being movable upon contact by a surface of the molded hollow plastic article from a first position restricting the vacuum access to a second position enhancing the vacuum access, and a biasing element biasing the spool toward the first position so that vacuum access is restricted in the absence of a molded hollow plastic article within the insert.

14. The molded article handling apparatus of claim 11 wherein the transfer assembly comprises:

a plate mounted for movement with respect to the base having a first side and a second side, a plurality of pairs of gripper bars situated on the first side of the plate, each pair of gripper bars including confronting surfaces having opposing contact regions for gripping a portion of the molded hollow plastic articles, at least two pins fixed to each gripper bar, each pin penetrating through a slot in the plate between the first side and the second side, the slots allowing reciprocal movement of the pins and gripper bars in a direction generally perpendicular to said confronting surfaces, a plurality of cam elements situated on the base plate second side, each cam element engaging at least one pin fixed to each of the gripper bars forming one of said pair of gripper bars, and a plurality of actuators, each actuator coupled to all the cam elements engaging a selected pair of gripper bars to cause coordinated movement of the cam elements to drive the reciprocal movement of the pins and gripper bars.

15. The molded article handling apparatus of claim 14 further comprising:

a mounting for mounting said transfer assembly plate to said gantry including a pivot axis, and a third motor for rotating the mounting and transfer assembly plate about the pivot axis from a plane generally aligned with said molded article engagement apparatus to a plane generally orthogonal thereto.

16. The molded article handling apparatus of claim 9 wherein the molded article engagement apparatus cooling assembly comprises:

an frame unit including connections to a source of fluid coolant and to a source of vacuum, at plurality of sleeves fixed to the frame unit, the number and position of sleeves being equal to the number and location of the hollow plastic articles which are released at one time in said space between the molding elements, an insert, situated within each sleeve, the insert having an outer surface defining within the sleeve a fluid coolant path coupled to the source of fluid coolant, the insert having an interior surface matching, but slightly larger than, the molded hollow plastic article outer surface, and an open end permitting insertion of the molded article within the insert.

17. The molded article handling apparatus of claim 16 wherein the molded article engagement assembly further comprises:

a spool situated within each sleeve having an outer surface defining within the sleeve a restricted path coupled to the source of vacuum, the spool being movable upon contact by a surface of the molded hollow plastic article from a first position restricting the vacuum access to a second position enhancing the vacuum access, and a biasing element biasing the spool toward the first position so that vacuum access is restricted in the absence of a molded article within the insert.

18. A molded parison handling apparatus for removing hollow plastic parisons used in the manufacture of oriented plastic bottles from an injection molding machine, the injection molding machine including at least two molding elements movable between a closed conformation wherein the parisons are molded and an open conformation wherein a set of the parisons are released in a space between the molding elements, the molded parison having a body portion and a finish portion, the handling apparatus comprising:

a base including an arm coupled to an injection molding machine, an carriage mounted on the base for movement in a first dimension into and out of the space between the molding elements when in said spaced conformation, a molded parison engagement apparatus coupled to the carriage for engaging the set of parisons as they are released from the molding machine, the engagement apparatus including a cooling assembly for cooling the body portion of the set of molded parisons while they are engaged by the engagement apparatus, a first motor coupled to the arm for moving the carriage and engagement apparatus between said space between the molding elements and any of at least two preselected positions along the first dimension located outside the molding machine, and a transfer assembly including at least two sets of grabbers, each set of the grabbers mounted for movement with respect to the base to any of corresponding separate at least two preselected remote positions, for grabbing the finish portion of the parisons from the parison engagement apparatus, a set of the article grabbers being positioned to confront the parisons held by the engagement apparatus at each of said preselected positions along the first dimension and to grab and move the confronted parisons to any of the corresponding separate at least two preselected remote positions, so that operation of the first motor moving the carriage and the engagement apparatus to one of the at least two preselected positions located outside the molding machine achieves a selection of at least one of the corresponding separate at least two preselected remote positions for deposit of the parisons.

19. The molded parison handling apparatus of claim 18 wherein the molded parison engagement apparatus comprises:

an frame unit coupled to the carriage including connections to a source of fluid coolant and to a source of vacuum, a set of sleeves fixed to the frame unit, the sleeves being arranged in an array matching the parison locations as they are released from the molding machine, an insert, situated within each sleeve, the insert having an outer surface defining within the sleeve a fluid coolant path coupled to the source of fluid coolant, the insert having an interior surface matching, but slightly larger than, the parison body portion outer surface, and an open end permitting insertion of one of the set of parisons within the insert, a spool situated within each sleeve having an outer surface defining within the sleeve a restricted path coupled to the source of vacuum, the spool being movable upon contact by a surface of one of the set of parisons from a first position restricting the vacuum access to a second position enhancing the vacuum access, and a biasing element biasing the spool toward the first position so that vacuum access is restricted in the absence of a parison within the insert.

20. The molded article handling apparatus of claim 19 wherein the transfer assembly comprises:

a plate mounted for movement with respect to the base having a first side and a second side, at least two sets of pairs of gripper bars situated on the first side of the plate, each pair of gripper bars including confronting surfaces having opposing contact regions for gripping the finish portion of the parisons, at least two pins fixed to each gripper bar, each pin penetrating through a slot in the plate between the first side and the second side, the slots allowing reciprocal movement of the pins and gripper bars in a direction generally perpendicular to said confronting surfaces, a plurality of cam elements situated on the base plate second side, each cam element engaging at least one pin fixed to each of the gripper bars forming one of said pair of gripper bars, and a plurality of actuators, each actuator coupled to all the cam elements engaging a selected pair of gripper bars to cause coordinated movement of the cam elements to drive the reciprocal movement of the pins and gripper bars.

21. The molded parison handling apparatus of claim 20 further comprising:

a gantry mounted on the base for movement in a second dimension generally orthogonal to said first dimension, a mounting for mounting said transfer assembly plate to said gantry including a pivot axis, a second motor coupled to the gantry for moving the gantry and transfer assembly relative to the base between a position contiguous to the molded parison engagement apparatus where the molded parsons are grabbed and at least one of said remote positions along said second dimension, and a third motor for rotating the mounting and transfer assembly plate relative to the gantry about the pivot axis from a plane generally aligned with said molded parison engagement apparatus to a plane generally orthogonal thereto.

22. The molded article handling apparatus of claim 20 further comprising at least one storage receiver situated on the base at one of said remote positions along the second axis for receiving the molded parisons from the transfer assembly, each storage receiver including at least two sets of cooling chambers for cooling the molded hollow plastic articles while they are being stored by the storage receiver, each set of cooling chambers being equal in number to the number of parisons released at one time by the injection molding machine.

23. A transfer assembly for transferring articles from a first position to a second position, the transfer assembly comprising:

a base plate having a first side and a second side, at least one pair of gripper bars situated on the first side of the base plate, each pair of gripper bars including confronting surfaces having opposing contact regions for gripping the articles, at least two pins fixed to each gripper bar, each pin penetrating through a slot in the base plate between the first side and the second side, the slots allowing reciprocal movement of the pins and gripper bar in a direction generally perpendicular to said confronting surfaces, at least one cam element situated on the base plate second side, each cam element engaging at least one pin fixed to each of the gripper bars forming one of said pair of gripper bars, and at least one actuator coupled to all the cam elements engaging a selected pair of gripper bars to cause coordinated movement of the cam elements to drive the reciprocal movement of the pins and gripper bars.

24. The transfer assembly of claim 23 wherein the cam element comprises a rotatable member coupled to the second side of the base plate including a pair of slots, each slot engaging one of said pins fixed to the gripper bars of a selected pair of gripper bars.

* * * * *